United States Patent [19]

Bobsein et al.

[11] Patent Number: 4,808,698

[45] Date of Patent: Feb. 28, 1989

[54] PRODUCTION OF AROMATIC SULFIDE/SULFONE POLYMERS

[75] Inventors: Rex L. Bobsein; Earl Clark, Jr., both of Bartlesville, Okla.

[73] Assignee: Phillips Petroleum Company, Bartlesville, Okla.

[21] Appl. No.: 103,480

[22] Filed: Sep. 30, 1987

[51] Int. Cl.$^4$ ............................................. C08G 75/20
[52] U.S. Cl. ..................................... 528/388; 528/391
[58] Field of Search .................................. 528/388, 391

[56] References Cited

U.S. PATENT DOCUMENTS

| | | | |
|---|---|---|---|
| 4,102,875 | 7/1978 | Campbell | 528/388 |
| 4,127,713 | 11/1978 | Campbell | 528/391 |

*Primary Examiner*—Harold D. Anderson
*Attorney, Agent, or Firm*—J. D. Brown

[57] ABSTRACT

An improved process for the production of high molecular weight aromatic sulfide/sulfone polymer comprising contacting under suitable polymerization conditions: (a) an organic amide, (b) an alkali metal sulfide or hydrosulfide, (c) water, and (d) a dihaloaromatic sulfone wherein the molar ratio of (a) to (b) is about 2:1 to about 24:1, the improvement comprising employing a molar ratio of (a) to (c) of about 0.4:1 to about 1.3:1.

36 Claims, No Drawings

PRODUCTION OF AROMATIC SULFIDE/SULFONE POLYMERS

FIELD OF THE INVENTION

This invention relates to the production of aromatic sulfide/sulfone polymers. In accordance with one aspect, this invention relates to the production of aromatic sulfide/sulfone polymers exhibiting high molecular weight. In accordance with a further aspect, this invention relates to the production of aromatic sulfide/sulfone polymers in a simplified and readily controlled manner.

BACKGROUND OF THE INVENTION

Thermoplastic polymers having a high degree of heat resistance or thermal stability are the object of intensive research and development in many laboratories throughout the world. Because thermoplastic materials comprising these polymers can be molded rapidly and efficiently to articles of simple or of complex design, mass production techniques can be utilized to provide a wide variety of useful products. Heat resistant thermoplastic polymers thus offer important advantages that can be utilized in applications such as electrical components, wire coatings, automotive parts, aircraft parts and the like. Often such polymers can be used in the form of composite materials which contain high temperature resistant fibers and fillers.

Arylene sulfide/sulfone polymers are thermoplastic polymers known in the art, and processes for making these polymers are disclosed in various U.S. Patents of R. W. Campbell, e.g. U.S. Pat. Nos. 4,016,145, 4,102,875, 4,127,713 and 4,301,274. Although these patents represent significant and valuable advances in the art, there is a need for a simplified process which can provide aromatic sulfide/sulfone polymers having high molecular weight.

In particular, problems have been encountered in obtaining a sufficiently high molecular weight aromatic sulfide/sulfone polymer whenever the concentration with respect to the sulfur-containing compound utilized in the preparation thereof has been varied over a wide range. Such a variation in concentration may be required for example, in scaling up suitable polymerization processes from a smaller size polymerization vessel to a larger vessel. Since larger vessels often will utilize different stirring means, the efficiency of stirring may vary significantly from one vessel size to another which in turn may require the utilization of a more dilute polymerization reaction mixture for those situations which encounter a less efficient stirring means. For reasons not completely understood, variations with respect to the concentration of a sulfur-containing polymerization component can cause difficulty in achieving the desired high molecular weight aromatic sulfide/sulfone polymer.

Accordingly, an object of our invention is to produce aromatic sulfide/sulfone polymers exhibiting high molecular weight.

It is a further object of our invention to provide a simplified, readily controllable process for producing high molecular weight aromatic sulfide/sulfone polymers.

A further object of our invention is to provide a simplified, readily controllable process for producing high molecular weight aromatic sulfide/sulfone polymers over a wide range of concentration with respect to the sulfur-containing component of the polymerization reaction mixture.

Other objects and aspects, as well as the several advantages of our invention are apparent from a study of this disclosure and the appended claims.

BRIEF STATEMENT OF THE INVENTION

According to our invention improved results in terms of the molecular weight of aromatic sulfide/sulfone polymers are achieved by the employment of a molar ratio of organic amide to water within a certain specified range when the molar ratio of organic amide to sulfur-containing compound is allowed to vary within a specified range. The improved results are reflected in obtaining aromatic sulfide/sulfone polymers characterized by an inherent viscosity of about 0.39 to about 0.7.

We have discovered in the preparation of aromatic sulfide/sulfone polymers which utilizes a molar ratio of organic amide to sulfur-containing compound of about 2:1 to about 24:1 that by employing a molar ratio of said organic amide to water at a value selected from within the range of about 0.4:1 to about 1.3:1 that high molecular weight aromatic sulfide/sulfone polymers are readily formed.

In a particular aspect, our invention provides a process for producing an aromatic sulfide/sulfone polymer characterized by an inherent viscosity of about 0.39 to about 0.7, wherein the molar ratio of the organic amide to sulfur-containing compound is about 4:1 to about 16:1 and the molar ratio of said organic amide to water is about 0.5:1 to about 1:1.

The embodiments of our invention are utilized in a process for the production of an aromatic sulfide/sulfone polymer which comprises contacting at least one organic amide, at least one sulfur-containing compound selected from the group consisting of alkali metal sulfides and alkali metal hydrosulfides, water, and at least one dihaloaromatic sulfone under polymerization conditions of time and temperature sufficient to produce an aromatic sulfide/sulfone polymer.

Our invention thus provides a simplified process for producing aromatic sulfide/sulfone polymers having a high molecular weight.

DETAILED DESCRIPTION OF THE INVENTION

The organic amides used in the method of our invention should be substantially liquid at the reaction temperatures and pressure employed. The amides can be cyclic or acyclic and can have one to about ten carbon atoms per molecule. Examples of some suitable amides include formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, ε-caprolactam, N-methyl-ε-caprolactam, N-methyl-2-pyrrolidone, N-ethyl-2-pyrrolidone, N-cyclohexyl-2-pyrrolidone, N-dodecyl-3-octyl-2-pyrrolidone, N,N'-ethylenedi-2-pyrrolidone, hexamethylphosphoramide, tetramethylurea, and the like and mixtures thereof.

The sulfur-containing compound utilized according to our invention is selected from the group consisting of alkali metal sulfides and alkali metal hydrosulfides. Suitable alkali metal sulfides include lithium sulfide, sodium sulfide, potassium sulfide, rubidium sulfide, and cesium sulfide. Suitable alkali metal hydrosulfides include lithium hydrosulfide, sodium hydrosulfide, potassium hydrosulfide, rubidium hydrosulfide, and cesium hydrosulfide. The alkali metal sulfides and alkali metal hydrosulfides can be conveniently utilized according to our invention as an aqueous solution or dispersion of these components. For example, an aqueous solution of sodium hydrosulfide having about 60 weight percent sodium hydrosulfide is convenient to use.

Dihaloaromatic sulfones employed in the process of our invention can be represented by the formula

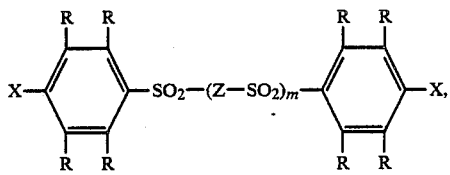

where each X is selected from the group consisting of fluorine, chlorine, bromine, and iodine; Z is a divalent radical selected from the group consisting of

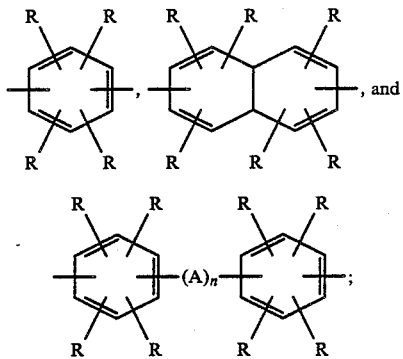

m is 0 or 1; n is 0 or 1; A is selected from the group consisting of oxygen, sulfur, sulfonyl, and $CR_2$; and each R selected from the group consisting of hydrogen and alkyl radicals have one to about 4 carbon atoms, the total number of carbon atoms in all of the R groups in the molecule being 0 to about 12. Preferably m is 0.

Examples of some dihaloaromatic sulfones that can be employed in the process of our invention include bis(p-fluorophenyl)sulfone, bis(p-chlorophenyl)sulfone, bis(p-bromophenyl)sulfone, bis(p-iodophenyl)sulfone, p-chlorophenyl p-bromophenyl sulfone, p-iodophenyl 3-methyl-4-fluorophenyl sulfone, bis(2-methyl-4-chlorophenyl)sulfone, bis(2,5-diethyl-4-bromophenyl)sulfone, bis(3-isopropyl-4-iodophenyl) sulfone, bis(2,5-dipropyl-4-chlorophenyl)sulfone, bis(2-butyl-4-fluorophenyl)sulfone, bis(2,3,5,6-tetramethyl-4-chlorophenyl)sulfone, 2-isobutyl-4-chlorophenyl 3-butyl-4-bromophenyl sulfone, 1,4-bis(p-chlorophenylsulfonyl)benzene, 1-methyl-2,4-bis(p-fluorophenylsulfonyl)benzene, 2,6-bis(p-bromophenylsulfonyl)naphthalene, 7-ethyl-1,5-bis(p-iodophenylsulfonyl)naphthalene, 4,4'-bis(p-chlorophenylsulfonyl)biphenyl, bis[p-(p-bromophenylsulfonyl)phenyl]ether, bis[p-(p-chlorophenylsulfonyl)phenyl]sulfide, bis[p-(p-chlorophenylsulfonyl)phenyl]sulfone, bis[p-(p-bromophenylsulfonyl)phenyl]methane, 5,5-bis[3-ethyl-4-(p-chlorophenylsulfonyl)phenyl]nonane, and the like, and mixtures thereof. Bis(p-chlorophenyl)sulfone is preferred for reasons of availability and generally good results.

Although the amount of dihaloaromatic sulfone employed according to our invention can vary widely, generally good results are obtained with a molar ratio of dihaloaromatic sulfone to sulfur-containing compound of about 0.7:1 to about 1.3:1. Preferably, this molar ratio is about 0.9:1 to about 1.15:1.

The molar ratio of organic amide to sulfur-containing compound utilized according to our invention can vary broadly from about 2:1 to about 24:1, preferably about 4:1 to about 16:1. We have found that when these ratios are employed, the utilization of an organic amide to water molar ratio selected from within the range of about 0.4:1 to about 1.3:1, preferably about 0.5:1 to about 1:1, provides aromatic sulfide/sulfone polymers of high molecular weight as reflected by the inherent viscosity values for said polymers.

It is optional according to the process of our invention, to employ a base in the polymerization step for preparing aromatic sulfide/sulfone polymers. A suitable base according to this optional feature of our invention is selected from the group consisting of alkali metal hydroxides, alkali metal carbonates, and mixtures of alkali metal hydroxides with alkali metal carbonates. Suitable alkali metal hydroxides include lithium hydroxide, sodium hydroxide, potassium hydroxide, rubidium hydroxide, and cesium hydroxide. Suitable alkali metal carbonates include lithium carbonate, sodium carbonate, potassium carbonate, rubidium carbonate, and cesium carbonate.

When a base is employed according to this optional feature of our invention the molar ratio of said base to the sulfur-containing compound is about 0.5:1 to about 4:1, preferably about 0.5:1 to about 2.05:1.

It is also optional, according to the process of our invention, to employ an alkali metal carboxylate as a component in the polymerization process. If employed according to this second optional feature of our invention, the molar ratio of alkali metal carboxylate to the sulfur-containing compound will be about 0.5:1 to about 1.5:1, preferably about 0.98:1 to about 1.02:1.

Suitable alkali metal carboxylates can be represented by the formula $R'CO_2M$ where $R'$ is a hydrocarbyl radical selected from alkyl, cycloalkyl, and aryl and combinations thereof such alkaryl, aralkyl, and the like, the number of carbon atoms in said $R'$ being within the range of 1 to about 20, and M is an alkali metal selected from lithium, sodium, potassium, rubidium, and cesium.

Examples of some alkali metal carboxylates that can be employed in the process of our invention include lithium acetate, sodium acetate, potassium acetate, lithium propionate, sodium propionate, lithium 2-methylpropionate, rubidium butyrate, lithium valerate, sodium valerate, cesium hexanoate, lithium heptanoate, lithium 2-methyloctanoate, potassium dodecanoate, rubidium 4-ethyltetradecanoate, sodium octadecanoate, sodium heneicosanoate, lithium cyclohexanecarboxylate, cesium cyclododecanecarboxylate, sodium 3-methylcyclopentanecarboxylate, potassium cyclohexylacetate, potassium benzoate, lithium benzoate, sodium benzoate, potassium m-toluate, lithium phenylacetate, sodium 4-phenylcyclohexanecarboxylate, potassium p-tolylacetate, lithium 4-ethylcyclohexylacetate and the like and mixtures thereof.

Although our invention can be carried out by charging the various polymerization reaction mixture components in any order, it is presently preferred for best results to prereact a cyclic organic amide with an alkali metal hydroxide in the presence of water and subsequently contact this mixture with the sulfur-containing compound to form a complex comprising these components. Said complex is then utilized to contact at least one dihaloaromatic sulfone under suitable polymerization conditions to produce the aromatic sulfide/sulfone polymer.

Although the reaction temperature at which the polymerization is conducted can vary over a considerable range, generally it will be within the range of about 140° C. to about 240° C., preferably about 185° C. to about 225° C. The reaction time can vary widely, depending in part on the reaction temperature employed, but generally will be within the range of about 10 minutes to about 72 hours, preferably about 1 hour to about 4 hours. The pressure should be sufficient to maintain the dihaloaromatic sulfone and other organic compounds present substantially in the liquid phase.

While not wishing to be bound by theory, we currently believe that the aromatic sulfide/sulfone polymer formed by the above-described process of our invention has the recurring units:

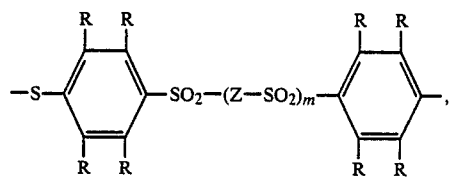

where each R, Z and m is as defined above.

The aromatic sulfide/sulfone polymers as produced by the process of our invention are in particle form and can be separated from the reaction mixture by conventional procedures, e.g. by filtration of the reaction mixture to recover the polymer followed by washing at least once with water. A presently preferred recovery method involves diluting the hot reaction mixture with a mixture of water and organic amide and cooling the quenched mixture with stirring. The separated polymer particles can then be washed with water preferably with at least a portion of the washing being conducted at an elevated temperature within the range of about 130° C. to about 250° C. to provide a polymer which is low in ash-forming substances and is relatively light in color as well as exhibiting good melt flow stability under conditions of melt processing operations such as injection molding. In addition, it is presently preferred to employ a zinc carboxylate salt in the treatment of the recovered aromatic sulfide/sulfone polymer in at least one of the above-described wash steps.

The aromatic sulfide/sulfone polymers produced by the process of our invention can be blended with fillers, fibers, pigments, extenders, other polymers and the like. They can be cured through cross-linking and/or chain extension, e.g., by heating at temperatures up to such as about 480° C. in the presence of a free oxygen-containing gas to provide cured products having high thermal stability and good chemical resistance. They are useful in the production of coatings, film, molded objects, and fibers. The polymers exhibit a good balance of properties for these uses, the heat deflection temperature being particularly outstanding.

EXAMPLES

Examples are provided in an effort to assist one skilled in the art to a further understanding of our invention, and yet not be unduly limitative of the reasonable scope of our invention. The particular reactants, conditions, ratios and the like, are all intended to be illustrative of our invention, and not limitative of the reasonable and suitable scope thereof.

EXAMPLE I

A series of polymerization runs were performed in a fast stirring, two gallon stainless steel reactor for the preparation of poly(p-phenylene sulfide/sulfone) (PPSS) as exemplary of the aromatic sulfide/sulfone polymers. The polymerization recipe for these runs is presented below.

| Recipe I | |
|---|---|
| Compound | g-mole |
| Sodium hydrosulfide (NaSH)[a] | 2.0 |
| Sodium hydroxide (NaOH) | 2.0 |
| bis(p-chlorophenyl)sulfone (BCPS) | 2.02 |
| N—methyl-2-pyrrolidone (NMP) | 16.0 |
| Water ($H_2O$)[b] | 9.42–40.0 |
| Sodium acetate (NaOAc) | 2.0 |

[a] Charged as a NaSH—$H_2O$ solid containing 58.47–59.9 wt. % NaSH and 0.31–0.51 wt. % $Na_2S$.
[b] Includes $H_2O$ in NaSH charge.

In each run the reactor was charged with the above reactants and the reactor was sealed and purged four times with nitrogen. The agitator was started and the rate was adjusted to 600 rpm. The reaction mixture was heated to 200° C. and held for 3 hours and the final pressure of the reactor was 70–135 psig. At the end of polymerization a mixture of 1200 mL NMP and 200 mL $H_2O$ was charged slowly to the reactor while maintaining the reactor temperature above 180° C. The heating was terminated and the reaction mixture cooled slowly with air circulating through the internal cooling coils.

The reactor was opened and the reactor contents were filtered to recover the PPSS. The recovered polymer was reslurried four times with deionized water, heated to 90°–95° C., filtered and rinsed with ambient temperature deionized water. The polymer was then dried in an electric oven at 118° C. for a minimum of 18 hours.

The results obtained are presented in TABLE I.

TABLE I

| | Run No. | Reactor Charges, mole ratio | | I.V., dL/g |
|---|---|---|---|---|
| | | NMP/NaSH | NMP/$H_2O$ | |
| Comparative: | 1 | 8.0 | 1.7 | 0.38 |
| | 2 | 8.0 | 1.7 | 0.39 |
| Invention: | 3 | 8.0 | 0.4 | 0.42 |
| | 4 | 8.0 | 0.4 | 0.39 |
| | 5 | 8.0 | 0.5 | 0.49 |
| | 6 | 8.0 | 0.51 | 0.50 |
| | 7 | 8.0 | 0.6 | 0.47 |
| | 8 | 8.0 | 0.6 | 0.52 |
| | 9 | 8.0 | 0.7 | 0.46 |
| | 10 | 8.0 | 0.7 | 0.45 |
| | 11[a] | 8.0 | 0.7 | 0.37 |
| | 12 | 8.0 | 0.8 | 0.42 |
| | 13 | 8.0 | 0.8 | 0.49 |
| | 14 | 8.0 | 0.85 | 0.51 |
| | 15 | 8.0 | 0.85 | 0.51 |
| | 16 | 8.0 | 0.9 | 0.41 |
| | 17 | 8.0 | 0.9 | 0.45 |
| | 18 | 8.0 | 0.9 | 0.47 |
| | 19 | 8.0 | 0.9 | 0.42 |
| | 20 | 8.0 | 1.0 | 0.49 |
| | 21 | 8.0 | 1.29 | 0.42 |
| | 22[a] | 8.0 | 1.29 | 0.39 |
| | 23 | 8.0 | 1.29 | 0.46 |

[a] These runs are thought to be non-representative based on repeat runs. The reason for the low I.V. values is presently unknown.

Inherent viscosities (I.V.) for PPSS samples were determined using a #200 Cannon-Fenske routine type viscometer at 30° C. with N-methyl-2-pyrrolidone (NMP) as the solvent at a polymer concentration of 0.5 g per dL NMP. Inherent viscosities provide an indication of relative molecular weights of PPSS polymers of the same type.

The variability of measuring I.V. by the above method has been determined to be ±0.02–0.03 when measured on the same batch by the same person. Batch to batch variability of the I.V. is caused by random deviations in the following: weighing and analysis of feedstocks, thermal history, polymer recovery conditions, I.V. determinations, and changes in reagents, particularly NaSH.

The results in TABLE I indicate that PPSS with I.V. greater than about 0.39 can be prepared by maintaining the NMP/H$_2$O mole ratio within the range of about 0.4:1 to about 1.3:1 as evidenced by inventive Runs 3–23. By maintaining the NMP/H$_2$O mole ratio within the range of about 0.5:1 to about 1.0:1, PPSS with I.V. greater than about 0.42 can be prepared as evidenced by inventive Runs 5–20. Increasing the NMP/H$_2$O mole ratio above about 1.3:1 results in producing PPSS with I.V. less than about 0.39 as evidenced by comparative Runs 1 and 2.

EXAMPLE II

A series of polymerization runs for the preparation of PPSS were performed according to the procedure of Example I. The polymerization recipe for these runs is presented below.

| Recipe II | |
|---|---|
| Compound | g-mole |
| Sodium hydrosulfide (NaSH)[a] | 1.5–4.0 |
| Sodium hydroxide (NaOH) | 1.5–4.0 |
| bis(p-chlorophenyl)sulfone (BCPS) | 1.52–4.04 |
| N—methyl-2-pyrrolidone (NMP) | 16.0–24.0 |
| Water (H$_2$O)[b] | 18.82–28.24 |
| Sodium acetate (NaOAc) | 1.5–4.0 |

[a]Charged as a NaSH—H$_2$O solid containing 58.47 wt. % NaSH and 0.51 wt. % Na$_2$S.
[b]Includes H$_2$O in NaSH charge.

The results obtained are presented in TABLE II. The NaOH/NaSH and NaOAc/NaSH mole ratios were held constant at 1.0:1 for all the runs. The BCPS/NaSH mole ratio was held constant at 1.01:1 for all the runs.

TABLE II

| Run No. | Reactor Charges, Mole Ratio | | I.V., dL/g |
|---|---|---|---|
| | NMP/NaSH | NMP/H$_2$O | |
| 14 | 8.0 | 0.85 | 0.51 |
| 15 | 8.0 | 0.85 | 0.51 |
| 24 | 4.0 | 0.85 | 0.46 |
| 25 | 4.0 | 0.85 | 0.48 |
| 26 | 6.0 | 0.85 | 0.44 |
| 27 | 6.0 | 0.85 | 0.53 |
| 28 | 12.0 | 0.85 | 0.54 |
| 29 | 12.0 | 0.85 | 0.43 |
| 30 | 12.0 | 0.85 | 0.57 |
| 31 | 16.0 | 0.85 | 0.40 |
| 32 | 16.0 | 0.85 | 0.45 |

The results in TABLE II indicate that PPSS with I.V. greater than about 0.4 can be produced when varying the NMP/NaSH mole ratio from 4:1 to 16:1 while maintaining a constant NMP/H$_2$O mole ratio of 0.85:1, as evidenced by Runs 14–15 and 24–32. This is particularly useful as a means of controlling the polymer molecular weight when operating difficulties requiring a higher NMP/NaSH mole ratio are encountered during scale-up from the laboratory to the commercial scale.

EXAMPLE III

A series of polymerization runs were performed in a 90 gallon stirred (500 rpm) reactor for the preparation of PPSS. The polymerization recipe for these runs is presented below.

| Recipe III | |
|---|---|
| Compound | lb-mole |
| Sodium hydrosulfide (NaSH)[a] | 0.3199–0.3215 |
| Sodium hydroxide (NaOH)[b] | 1.2402–0.244 |
| Sodium carbonate (Na$_2$CO$_3$) | 0.0802–0.0896 |
| bis(p-chlorophenyl)sulfone (BCPS) | 0.3189–0.3214 |
| N—methyl-2-pyrrolidone (NMP) | 1.9838–2.5616 |
| Water (H$_2$O)[c] | 1.6945–2.7683 |
| Sodium acetate (NaOAc) | 0.3206 |

[a]Charged as an aqueous solution of 58.47–60.22 wt. % NaSH and 0.32–0.51 wt. % Na$_2$S.
[b]Charged as an aqueous solution of 49.89–50.36 wt. % NaOH.
[c]Includes H$_2$O in NaSH and NaOH charges.

In each run the aqueous NaOH and a portion of the NMP were premixed in a separate vessel for 5 hours at 115°–125° C. The aqueous NaSH was then charged and the resulting mixture held for 30 minutes to form a NaSH:NaOH:NMP complex. In the polymerization reactor, BCPS, Na$_2$CO$_3$, NaOAc and a portion of the NMP were charged and heated to approximately 88° C. The admixture containing the complex was then charged to the polymerization reactor with a subsequent flush using the remaining NMP. The reaction mixture was then heated to 200° C. at 1.5°–1.8° C./minute in 48–59 minutes. The reaction mixture was held at 200° C. for 210 minutes.

At the end of polymerization,, the agitator speed was increased to 550 rpm and 0.96–1.6 lb-mole NMP and 1.57–3.71 lb-mole water were premixed and added to the reactor. The reaction mixture was then cooled to 105°–109° C. at 0.81°–1.8° C./minute. The resulting polymer slurry was filtered to facilitate recovery of the NMP. The polymer was reslurried in ambient deionized (DI) water and filtered using a hot (82° C.) DI water rinse. The polymer was then given two hot (176° C.) washes using deaerated DI water and filtered using a hot DI water rinse. The second hot wash slurry was treated with a small amount (340 g) of zinc acetate. The washing steps utilized a slurry mixing tank and a nylon fabric filter cloth on a moving horizontal belt filter system to separate the PPSS from the wash/rinse liquid. The washed PPSS from each run was dried and a sample tested for inherent viscosity.

The results obtained are presented in TABLE III. The NaOH/NaSH mole ratio ranged from 0.747–0.76:1, the Na$_2$CO$_3$/NaSH mole ratio ranged from 0.25–0.28:1, the BCPS/NaSH mole ratio ranged from 0.9969–0.9997:1 and the NaOAc/NaSH mole ratio ranged from 0.997–1.002:1.

TABLE III

| Run No. | Reactor Charges, mole ratio | | I.V., dL/g |
|---|---|---|---|
| | NMP/NaSH | NMP/H$_2$O | |
| 33 | 6.18 | 1.02 | 0.42 |
| 34 | 6.18 | 1.02 | 0.43 |
| 35 | 6.18 | 0.99 | 0.44 |
| 36 | 7.99 | 1.00 | 0.42 |
| 37 | 8.01 | 1.00 | 0.42 |

TABLE III-continued

| Run No. | Reactor Charges, mole ratio | | I.V., dL/g |
|---|---|---|---|
| | NMP/NaSH | NMP/H$_2$O | |
| 38 | 8.01 | 1.00 | 0.38 |
| 39 | 7.99 | 1.00 | 0.45 |
| 40 | 7.99 | 0.85 | 0.47 |
| 41 | 7.97 | 0.85 | 0.42 |

The results in TABLE III demonstrate that the method of controlling the polymer molecular weight by controlling the NMP/H$_2$O mole ratio within a specified range as the NMP/NaSH mole ratio varies scales up well from the laboratory to the pilot plant. As the NMP/NaSH mole ratio is varied from approximately 6.2:1 (Runs 33-36) to approximately 8.0:1 (Runs 36-41), the I.V. is maintained greater than about 0.42. The reason for the lower I.V. for Run 38 is presently unknown. In addition, Runs 40 and 41 demonstrate that high I.V. PPSS can be produced when the NMP/H$_2$O mole ratio is lowered from 1.0:1 to 0.85:1.

That which is claimed:

1. In a process for the production of an aromatic sulfide/sulfone polymer comprising contacting
   (a) at least one organic amide,
   (b) at least one sulfur-containing compound selected from the group consisting of alkali metal sulfides and alkali metal hydrosulfides,
   (c) water, and
   (d) at least one dihaloaromatic sulfone under polymerization conditions of time and temperature sufficient to produce an aromatic sulfide/sulfone polymer, and wherein the molar ratio of said organic amide to said sulfur-containing compound is subject to variation within the range of about 2:1 to about 24:1, the improvement comprising employing a molar ratio of said organic amide to said water of about 0.4:1 to about 1.3:1.

2. A process according to claim 1 employing a molar ratio of said dihaloaromatic sulfone to said sulfur-containing compound of about 0.7:1 to about 1.3:1.

3. A process according to claim 2 wherein said organic amide is selected from the group consisting of cyclic and acyclic organic amides having from 1 to about 10 carbon atoms per molecule.

4. A process according to claim 3 wherein said sulfur-containing compound is selected from the group consisting of lithium sulfide, sodium sulfide, potassium sulfide, rubidium sulfide, cesium sulfide, lithium hydrosulfide, sodium hydrosulfide, potassium hydrosulfide, rubidium hydrosulfide, and cesium hydrosulfide.

5. A process according to claim 4 wherein said dihaloaromatic sulfone is represented by the formula

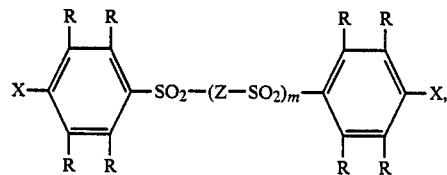

where each X is selected from the group consisting of fluorine, chlorine, bromine, and iodine; Z is a divalent radical selected from the group consisting of

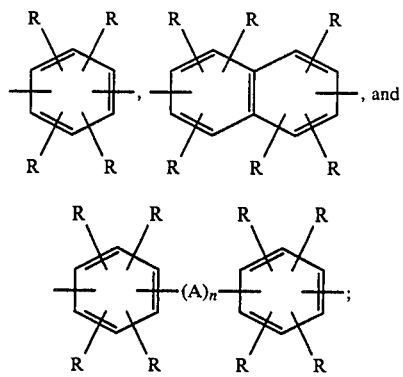

m is 0 or 1; n is 0 or 1; A is selected from the group consisting of oxygen, sulfur, sulfonyl, and CR$_2$; and each R is selected from the group consisting of hydrogen and alkyl radicals having 1 to about 4 carbon atoms, the total number of carbon atoms in all of the R groups in the molecule being 0 to about 12.

6. A process according to claim 5 wherein said organic amide is N-methyl-2-pyrrolidone, and said sulfur-containing compound is sodium hydrosulfide.

7. A process according to claim 6 wherein m is 0 and said dihaloaromatic sulfone is represented by the formula

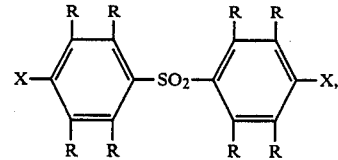

where each X is selected from the group consisting of fluorine, chlorine, bromine, and iodine, and each R is selected from the group consisting of hydrogen and alkyl radicals having 1 to about 4 carbon atoms, the total number of carbon atoms in all of the R groups being within the range of 0 to about 12.

8. A process according to claim 7 wherein said dihaloaromatic sulfone is bis(4-chlorophenyl)sulfone.

9. A process according to claim 8 wherein said polymerization conditions employ a temperature of about 140° C. to about 240° C. and a time of about 10 minutes to about 72 hours.

10. A process according to claim 1 wherein said aromatic sulfide/sulfone polymer is characterized by an inherent viscosity of about 0.39 to about 0.7 determined at 30° C. with N-methyl-2-pyrrolidone as the solvent at a polymer concentration of 0.5 g per dL solvent, and wherein the molar ratio of said organic amide to said sulfur-containing compound is about 4:1 to about 16:1, and wherein the molar ratio of said organic amide to said water is about 0.5:1 to about 1:1.

11. A process according to claim 10 employing a molar ratio of said dihaloaromatic sulfone to said sulfur-containing compound of about 0.7:1 to about 1.3:1.

12. A process according to claim 11 wherein said organic amide is selected from the group consisting of cyclic and acyclic organic amides having from 1 to about 10 carbon atoms per molecule.

13. A process according to claim 12 wherein said sulfur-containing compound is selected from the group consisting of lithium sulfide, sodium sulfide, potassium sulfide, rubidium sulfide, cesium sulfide, lithium hydrosulfide, sodium hydrosulfide, potassium hydrosulfide, rubidium hydrosulfide, and cesium hydrosulfide.

14. A process according to claim 13 wherein said dihaloaromatic sulfone is represented by the formula

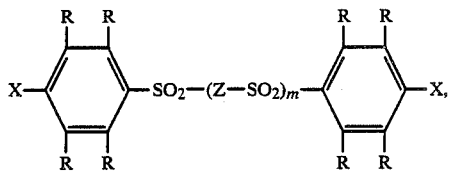

where each X is selected from the group comsisting of fluorine, chlorine, bromine, and iodine; Z is a divalent radical selected from the group consisting of

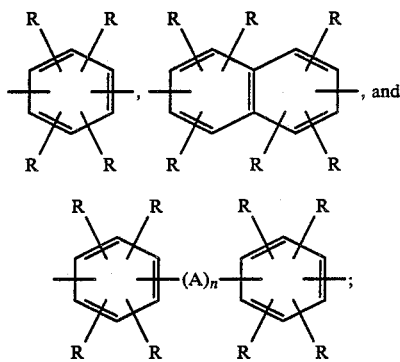

m is 0 or 1; n is 0 or 1; A is selected from the group consisting of oxygen, sulfur, sulfonyl, and $CR_2$; and each R is selected from the group consisting of hydrogen and alkyl radicals having 1 to about 4 carbon atoms, the total number of carbon atoms in all of the R groups in the molecule being 0 to about 12.

15. A process according to claim 14 wherein said organic amide is N-methyl-2-pyrrolidone, and said sulfur-containing compound is sodium hydrosulfide.

16. A process according to claim 15 wherein m is 0 and said dihaloaromatic sulfone is represented by the formula

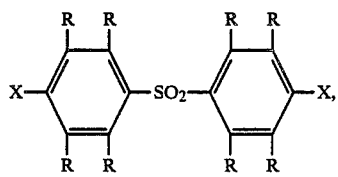

where each X is selected from the group consisting of fluorine, chlorine, bromine, and iodine, and each R is selected from the group consisting of hydrogen and alkyl radicals having 1 to about 4 carbon atoms, the total number of carbon atoms in all of the R groups being within the range of 0 to about 12.

17. A process according to claim 16 wherein said dihaloaromatic sulfone is bis(4-chlorophenyl)sulfone.

18. A process according to claim 17 wherein said polymerization conditions employ a temperature of about 140° C. to about 240° C., and a time of about 10 minutes to about 72 hours.

19. A process according to claim 10 wherein said organic amide is selected from the group consisting of cyclic and acyclic organic amides having from 1 to about 10 carbon atoms per molecule, and wherein there is employed at least one base selected from the group consisting of alkali metal hydroxides, alkali metal carbonates, and mixtures of alkali metal hydroxides with alkali metal carbonates.

20. A process according to claim 19 wherein there is employed at least one alkali metal carboxylate.

21. A process according to claim 20 wherein the molar ratio of said base to said sulfur-containing compound is about 0.5:1 to about 4:1 and the molar ratio of said alkali metal carboxylate to said sulfur-containing compound is about 0.5:1 to about 1.5:1.

22. A process according to claim 21 wherein said base is an alkali metal hydroxide selected from the group consisting of lithium hydroxide, sodium hydroxide, potassium hydroxide, rubidium hydroxide and cesium hydroxide.

23. A process according to claim 21 wherein said base is an alkali metal carbonate selected from the group consisting of lithium carbonate, sodium carbonate, potassium carbonate, rubidium carbonate, and cesium carbonate.

24. A process according to claim 21 wherein said base is a mixture of alkali metal hydroxide with alkali metal carbonate, wherein said alkali metal hydroxide is selected from the group consisting of lithium hydroxide, sodium hydroxide, potassium hydroxide, rubidium hydroxide and cesium hydroxide, and wherein said alkali metal carbonate is selected from the group consisting of lithium carbonate, sodium carbonate, potassium carbonate, rubidium carbonate, and cesium carbonate.

25. A process according to claim 22 wherein the molar ratio of said alkali metal hydroxide to said sulfur-containing compound is about 0.5:1 to about 2.05:1, the molar ratio of said alkali metal carboxylate to said sulfur-containing compound is about 0.98:1 to about 1.02:1, the molar ratio of dihaloaromatic sulfide to said sulfur-containing compound is about 0.9:1 to about 1.15:1 and wherein said alkali metal carboxylate is represented by the formula $R'CO_2M$ where $R'$ is a hydrocarbyl radical, the number of carbon atoms in said $R'$ being within the range of 1 to about 20, and M is an alkali metal selected from the group consisting of lithium, sodium, potassium, rubidium, and cesium.

26. A process according to claim 25 wherein said dihaloaromatic sulfone is represented by the formula

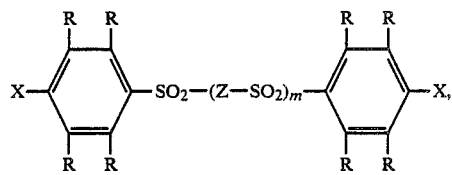

where each X is selected from the group consisting of fluorine, chlorine, bromine, and iodine; Z is a divalent radical selected from the group consisting of

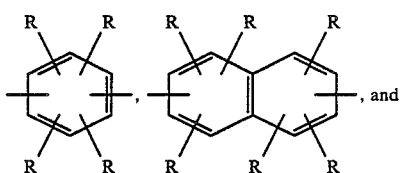

-continued

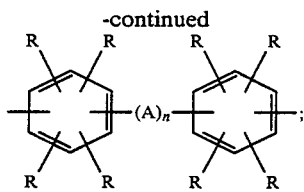

m is 0 or 1; n is 0 or 1; A is selected from the group consisting of oxygen, sulfur, sulfonyl, and $CR_2$; and each R is selected from the group consisting of hydrogen and alkyl radicals having 1 to about 4 carbon atoms, the total number of carbon atoms in all of the R groups in the molecule being 0 to about 12.

27. A process according to claim 26 wherein said alkali metal hydroxide is sodium hydroxide, said sulfur-containing compound is sodium hydrosulfide, said organic amide is N-methyl-2-pyrrolidone, said alkali metal carboxylate is sodium acetate, m is 0, and said dihaloaromatic sulfone is represented by the formula

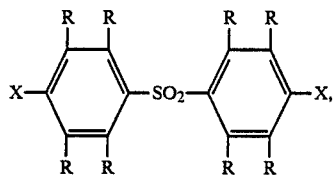

where each X is selected from the group consisting of fluorine, chlorine, bromine, and iodine, and each R is selected from the group consisting of hydrogen and alkyl radicals having 1 to about 4 carbon atoms, the total number of carbon atoms in all of the R groups being within the range of 0 to about 12.

28. A process according to claim 27 wherein said dihaloaromatic sulfone is bis(4-chlorophenyl)sulfone and said polymerization conditions employ a temperature of about 140° C. to about 240° C. and a time of about 10 minutes to about 72 hours.

29. A process according to claim 23 wherein the molar ratio of said alkali metal carbonate to said sulfur-containing compound is about 0.5:1 to about 2.05:1, the molar ratio of said alkali metal carboxylate to said sulfur-containing compound is about 0.98:1 to about 1.02:1, the molar ratio of said dihaloaromatic sulfone to said sulfur-containing compound is about 0.9:1 to about 1.15:1 and wherein said alkali metal carboxylate is represented by the formula R'CO$_2$M where R' is a hydrocarbyl radical, the number of carbon atoms in said R' being within the range of 1 to about 20, and M is an alkali metal selected from the group consisting of lithium, sodium, potassium, rubidium, and cesium.

30. A process according to claim 29 wherein said dihaloaromatic sulfone is represented by the formula

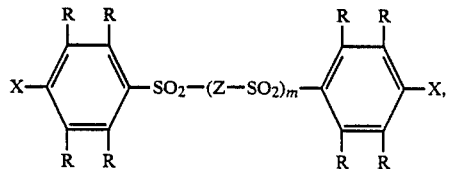

where each X is selected from the group consisting of fluorine, chlorine, bromine, and iodine; Z is a divalent radical selected from the group consisting of

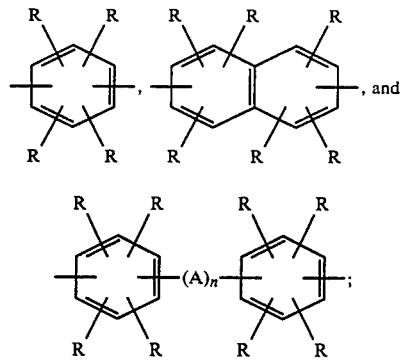

m is 0 or 1; n is 0 or 1; A is selected from the group consisting of oxygen, sulfur, sulfonyl, and $CR_2$; and each R is selected from the group consisting of hydrogen and alkyl radicals having 1 to about 4 carbon atoms, the total number of carbon atoms in all of the R groups in the molecule being 0 to about 12.

31. A process according to claim 30 wherein said alkali metal carbonate is sodium carbonate, said sulfur-containing compound is sodium hydrosulfide, said organic amide is N-methyl-2-pyrrolidone, said alkali metal carboxylate is sodium acetate, m is 0 and said dihaloaromatic sulfone is represented by the formula

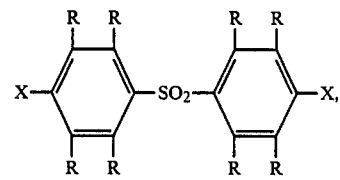

where each X is selected from the group consisting of fluorine, chlorine, bromine, and iodine, and each R is selected from the group consisting of hydrogen and alkyl radicals having 1 to about 4 carbon atoms, the total number of carbon atoms in all of the R groups being within the range of 0 to about 12.

32. A process according to claim 31 wherein said dihaloaromatic sulfone is bis(4-chlorophenyl)sulfone and said polymerization conditions employ a temperature of about 140° C. to about 240° C. and a time of about 10 minutes to about 72 hours.

33. A process according to claim 24 wherein the molar ratio of said mixture of said alkali metal hydroxide with said alkali metal carbonate to said sulfur-containing compound is about 0.5:1 to about 2.05:1, the molar ratio of said alkali metal carboxylate to said sulfur-containing compound is about 0.98:1 to about 1.02:1; the molar ratio of said dihaloaromatic sulfone to said sulfur-containing compound is about 0.9:1 to about 1.15:1; and wherein said alkali metal carboxylate is represented by the formula R'CO$_2$M wherein R' is a hydrocarbyl radical, the number of carbon atoms in said R' being within the range of 1 to about 20, and M is an alkali metal selected from the group consisting of lithium, sodium, potassium, rubidium, and cesium.

34. A process according to claim 33 wherein said dihaloaromatic sulfone is represented by the formula

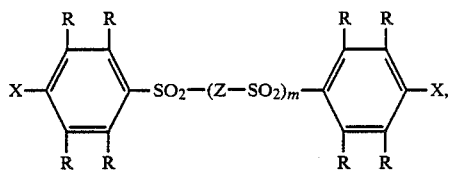

where each X is selected from the group consisting of fluorine, chlorine, bromine, and iodine; Z is a divalent radical selected from the group consisting of

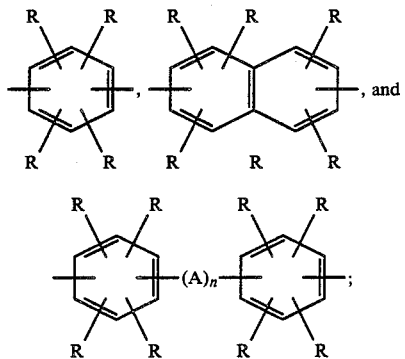

m is 0 or 1; n is 0 or 1; A is selected from the group consisting of oxygen, sulfur, sulfonyl, and $CR_2$; and each R is selected from the group consisting of hydrogen and alkyl radicals having 1 to about 4 carbon atoms, the total number of carbon atoms in all of the R groups in the molecule being 0 to about 12.

35. A process according to claim 34 wherein said alkali metal hydroxide is sodium hydroxide, said alkali metal carbonate is sodium carbonate, said sulfur-containing compound is sodium hydrosulfide, said organic amide is N-methyl-2-pyrrolidone, said alkali metal carboxylate is sodium acetate, m is 0 and said dihaloaromatic sulfone is represented by the formula

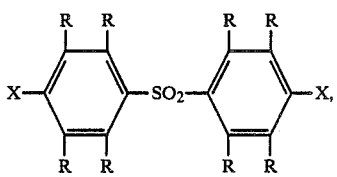

where each X is selected from the group consisting of fluorine, chlorine, bromine, and iodine, and each R is selected from the group consisting of hydrogen and alkyl radicals having 1 to about 4 carbon atoms, the total number of carbon atoms in all of the R groups being within the range of 0 to about 12.

36. A process according to claim 35 wherein said dihaloaromatic sulfone is bis(4-chlorophenyl)sulfone and said polymerization conditions employ a temperature of about 140° C. to about 240° C. and a time of about 10 minutes to about 72 hours.

* * * * *